US006633933B1

(12) United States Patent
Smith et al.

(10) Patent No.: US 6,633,933 B1
(45) Date of Patent: Oct. 14, 2003

(54) CONTROLLER FOR ATAPI MODE OPERATION AND ATAPI DRIVEN UNIVERSAL SERIAL BUS MODE OPERATION AND METHODS FOR MAKING THE SAME

(75) Inventors: Don Smith, Meadow Vista, CA (US); Ka Kit Ling, San Jose, CA (US); Neil H. MacLean, Scotts Valley, CA (US); Alan K. Ng, Sunnyvale, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/410,172

(22) Filed: Sep. 30, 1999

(51) Int. Cl.[7] .......................... G06F 13/00; G06F 13/12; G06F 3/00; G06F 5/00
(52) U.S. Cl. ............................. 710/74; 710/2; 710/8; 710/11; 710/14; 710/38; 710/62; 710/64; 710/65; 710/72; 710/104; 710/105
(58) Field of Search .......................... 710/2, 8, 11, 14, 710/36, 37, 38, 62–65, 71, 72, 74, 104, 105, 107, 129; 348/222, 232

(56) References Cited

U.S. PATENT DOCUMENTS

| | | | | |
|---|---|---|---|---|
| 5,661,848 A | * | 8/1997 | Bonke et al. | 360/48 |
| 5,696,931 A | * | 12/1997 | Lum et al. | 711/113 |
| 5,935,224 A | * | 8/1999 | Svancarek et al. | 710/63 |
| 6,145,046 A | * | 11/2000 | Jones | 710/100 |
| 6,182,162 B1 | * | 1/2001 | Estakhri et al. | 710/10 |
| 6,199,122 B1 | * | 3/2001 | Kobayashi | 709/214 |
| 6,266,720 B1 | * | 7/2001 | Kakinoki | 348/222 |
| 6,292,863 B1 | * | 9/2001 | Terasaki et al. | 710/129 |
| 6,304,925 B1 | * | 10/2001 | Liu et al. | 710/62 |
| 6,385,667 B1 | * | 5/2002 | Estakhri et al. | 710/8 |
| 6,388,591 B1 | * | 5/2002 | Ng | 341/100 |
| 6,507,881 B1 | * | 1/2003 | Chen | 710/130 |

OTHER PUBLICATIONS

M. Williams and D. Jolley, "*Universal Serial Bus Mass Storage Class Specification Overview*", pp. 1–8, Rev. 1.0a, Mar. 30, 1999, USB Implementers Forum.
Unknown, "*Universal Serial Bus Mass Storage Class*" Bulk–Only Transport, pp. 1–31, Rev. 1.0, Jun. 21, 1999, USB Implementers Forum.
Unknown, "*Universal Serial Bus Specification*", pp. 1–311, Rev. 1.1., Sep. 23, 1998, Compaq, Intel, Microsoft, and NEC.

* cited by examiner

Primary Examiner—Jeffrey Gaffin
Assistant Examiner—Tanh Q. Nguyen
(74) Attorney, Agent, or Firm—Martine & Penilla, LLP

(57) ABSTRACT

A controller for use in an optical storage device is provided. The controller includes a block decoder/encoder for processing data to and from a media of the optical storage device. An ATAPI interface is also provided and is configured to process data and control signals for selectively communicating data to and from the optical storage device during operation in an ATAPI mode. Universal serial bus (USB) logic is configured to process data and control signals for selectively communicating data to and from the optical storage device during operation in a USB mode. The USB logic is configured to utilize data transfer control logic implemented by the ATAPI interface. Accordingly, the one controller can be integrated into either an external peripheral device that communicates over a USB connection in the USB mode, or into an internal peripheral device that communicates over an IDE connection in the ATAPI mode. The optical storage device can be any type of optical storage device, such as, for example a CD-RW, a CD-ROM, a CD-R, a DVD, and the like. Further, the optical storage device can be in the form of an internal or external peripheral device.

21 Claims, 6 Drawing Sheets

| ATAPI PADS (on 104) | USB MODE | ATAPI MODE |
|---|---|---|
| HA2 | 0 | Signals from ATAPI pads |
| HA1 | 0 | Signals from ATAPI pads |
| HA0 | 0 | Signals from ATAPI pads |
| DMACK# | From 250 | Signals from ATAPI pads |
| HRD# | From 250 | Signals from ATAPI pads |
| HWR# | From 250 | Signals from ATAPI pads |
| HRST# | 1 | Signals from ATAPI pads |
| CS3FX# | 1 | Signals from ATAPI pads |
| CS1FX# | 0 | Signals from ATAPI pads |

Note: USB MODE column shows "Chooses data port" for HA2, spanning HA1 and HA0; "Controls transfers for USB Mode using ATAPI Logic" for DMACK#, spanning HRD# and HWR#; "Inactive" for HRST#; "Chooses data port" for CS3FX# spanning CS1FX#.

FIG. 6

CONTROLLER FOR ATAPI MODE OPERATION AND ATAPI DRIVEN UNIVERSAL SERIAL BUS MODE OPERATION AND METHODS FOR MAKING THE SAME

BACKGROUND OF THE INVENTION

1. Field of the Invention

This invention relates generally to computer systems, and more particularly to circuitry for interfacing and controlling data transfers between computer systems and peripheral devices.

2. Description of the Related Art

In recent years, computer manufacturers have been designing systems that provide users the ability to customize system features to match more closely their particular use requirements. Primarily, such customization has been made possible by the ease of connecting peripheral devices to a system. As is well known, a basic system typically includes a motherboard, a processor, random access memory (RAM), a hard drive, a floppy drive, a compact disc read-only memory (CD-ROM), a power supply and other miscellaneous circuitry. To enable users to further customize a system, the motherboard generally includes a number of connectors, such as, parallel port connectors, IDE connectors, and PCI connectors. Typically, IDE and PCI connectors are used to connect internal peripheral devices, and the parallel port connectors are used to connect external peripheral devices to the system. Generally, connections made by way of a parallel port connector are considered to be low-end connections which have significant performance limitations. On the other hand, connections made by way of PCI connectors utilize host adapter cards or controllers, which can provide communication using a higher-end SCSI protocol.

Although IDE and SCSI connections are commonly used for peripheral devices, a relatively new universal serial bus (USB) protocol has been gaining in popularity. Its popularity is particularly strong with casual computer users because the USB protocol is designed to more closely resemble a plug-and-play standard. That is, once a peripheral device is connected to a USB connector, that device will be ready for use without the typical setup and loading of drivers required for peripheral devices connected by way of other standards.

In response to USB's popularity, peripheral device manufacturers have been developing USB capable devices which meet the requirements set by the USB standard. The Universal Serial Bus Specification, revision 1.1 (1998), is hereby incorporated by reference. To meet the requirements of USB however, manufacturers have essentially been forced to redesign the logic circuitry of many of their existing peripheral devices. In essence, the advent of USB is requiring manufacturers to separately design peripheral devices which are able to function in parallel port mode, IDE/ATAPI mode, SCSI mode, and USB mode.

For ease of discussion, FIG. 1 illustrates a system diagram 10 including a computer system 12 and associated peripheral devices. The computer system 12 can have a number of peripheral devices, including an internal peripheral device 16a and connections to external peripheral devices, such as 16b. When the external peripheral device 16b is implemented, an external cable 14 is used to connect up to the computer system 12. Typically, the external cable 14 supports either a parallel port connection or a SCSI connection. As mentioned above, most internal peripheral devices are connected to the motherboard (now shown) of the computer system 12 by way of an IDE connector. Internal SCSI peripheral devices can also be used in the computer system 12, however, internal SCSI peripheral devices are typically more expensive and are generally only used in higher-end systems.

Accordingly, manufacturers of peripheral devices, such as optical disc-type peripheral recordable (CD-RW) devices), are required to specially design logic circuitry that is compatible with each specific data transfer protocol. As a result, each peripheral device, depending upon whether it is an internal device or an external device, needs to be uniquely designed to carry out the functions for the particular implementation.

To meet the specification requirements of USB, manufacturers of such peripheral devices are now integrating additional circuitry into peripheral devices that meet all of the required functionality and memory buffering necessary for USB data transfers. Although the design of specialized USB circuitry for those external peripheral devices is well known, when the manufacturer of peripheral devices design the circuitry for an external peripheral device, the internal peripheral device will have distinct logic circuitry to complete transfers using a different protocol, such as the IDE/ATAPI protocol. Consequently, the manufacturer of peripheral devices has now been driven to separately design, maintain, and revise the circuitry for USB external peripheral and internal IDE/ATAPI peripheral devices. As a result, the cost to the peripheral device manufacturer is substantially increased because the circuitry used for one protocol can not be used or shared by another protocol.

In view of the foregoing, there is a need for circuitry that can shared between different data transfer protocols, and can be enabled to operate in a selected protocol. There is also a need for logic circuitry that will enable one logic circuit design to be used interchangeably in internal peripheral device applications and external peripheral device applications.

SUMMARY OF THE INVENTION

Broadly speaking, the present invention describes peripheral device circuitry, and more particularly, controller circuitry that enables communication of peripheral devices using more than one communication protocol. In one embodiment, the controller circuitry is intelligently designed to implement communication in either an IDE/ATAPI mode or in a USB mode, and the controller circuitry utilized for USB mode operation is configured to share control circuitry used for IDE/ATAPI mode communication. It should be appreciated that the present invention can be implemented in numerous ways, including as a process, an apparatus, a system, a device, a method, or a computer readable medium. Several inventive embodiments of the present invention are described below.

In one embodiment, a controller for use in a mass storage peripheral device is disclosed. The controller includes a block decoder/encoder for processing data to and from a media of the mass storage peripheral device. Further included is an interface that is configured to process data and control signals for selectively communicating data to and from the mass storage peripheral device during operation in a first mode. Logic that is configured to process data and control signals for selectively communicating data to and from the mass storage peripheral device during operation in a second mode is also included. The logic is preferably configured to utilize data transfer control logic implemented by the interface.

In another embodiment, a controller for use in a compact disc peripheral device is disclosed. The controller includes a block decoder/encoder for processing data to and from a media of the compact disc peripheral device. An ATAPI interface is also provided and is configured to process data and control signals for selectively communicating data to and from the compact disc peripheral device during operation in an ATAPI mode. Universal serial bus (USB) logic is configured to process data and control signals for selectively communicating data to and from the compact disc peripheral device during operation in a USB mode. The USB logic is configured to utilize data transfer control logic implemented by the ATAPI interface. Accordingly, one controller can be integrated into either an external peripheral device that communicates over a USB connection in the USB mode, or into an internal peripheral device that communicates over an IDE connection in the ATAPI mode.

In yet another embodiment, a method for making a controller for use in a peripheral device is disclosed. The controller is capable to operating the peripheral device in one of an ATAPI mode and a universal serial bus (USB) mode. The method includes: (a) integrating an ATAPI interface to the controller, the ATAPI interface is configured to control data transfers to and from the peripheral device in the ATAPI mode; and (b) integrating a USB logic block to the controller, the USB logic block is configured to facilitate data transfers to and from the peripheral device in the USB mode, the USB logic block being configured to share data transfer control from the ATAPI interface to complete the data transfers in the USB mode.

In still another embodiment, a controller for use in a compact disc rewritable (CD-RW) peripheral device is disclosed. The controller includes a block decoder/encoder for processing data to and from a media of the CD-RW peripheral device. An ATAPI interface that is configured to process data and to control signals for selectively communicating data to and from the CD-RW peripheral device during operation in an ATAPI mode is also included. Universal serial bus (USB) logic is further provided to process data and control signals for selectively communicating data to and from the CD-RW peripheral device during operation in a USB mode. The USB logic is configured to utilize data transfer control logic implemented by the ATAPI interface. Preferably, the USB logic includes a USB pad cell that provides connection to and from a USB cable and the ATAPI interface. Part of the USB logic includes USB core logic that is in communication with the USB pad cell, the ATAPI interface, and a microprocessor interface.

In another embodiment, a controller for use in an optical storage device is provided. The controller includes a block decoder/encoder for processing data to and from a media of the optical storage device. An ATAPI interface is also provided and is configured to process data and control signals for selectively communicating data to and from the optical storage device during operation in an ATAPI mode. Universal serial bus (USB) logic is configured to process data and control signals for selectively communicating data to and from the optical storage device during operation in a USB mode. The USB logic is configured to utilize data transfer control logic implemented by the ATAPI interface. Accordingly, one controller can be integrated into either an external peripheral device that communicates over a USB connection in the USB mode, or into an internal peripheral device that communicates over an IDE connection in the ATAPI mode. The optical storage device can be any type of optical storage device, such as, for example a CD-RW, a CD-ROM, a CD-R, a DVD, and the like. Further, the optical storage device can be in the form of an internal or external peripheral device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, in which like reference numerals designate like structural elements.

FIG. 6 illustrates how control signals of the ATAPI interface are selectively used to enable USB mode data transfers, in accordance with one embodiment of the present invention.

DETAILED DESCRIPTION OF THE PREFERRED EMBODIMENTS

An invention is described for peripheral device circuitry, and more particularly, controller circuitry that enables communication of peripheral devices using more than one communication protocol. In one embodiment, the controller circuitry is intelligently designed to implement communication in either an IDE/ATAPI mode or in a USB mode, and the controller circuitry utilized for USB mode operation is configured to share control circuitry used for IDE/ATAPI mode communication. It will be obvious, however, to one skilled in the art, that the present invention may be practiced without some or all of these specific details. In other instances, well known process operations have not been described in detail in order not to unnecessarily obscure the present invention.

Figure 1:
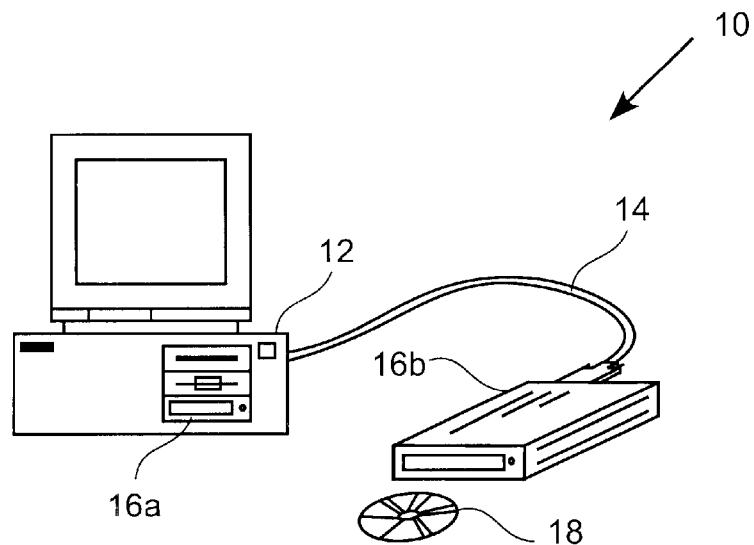
FIG. 1 illustrates a conventional system diagram including a computer system and associated peripheral devices.
Figure 2:
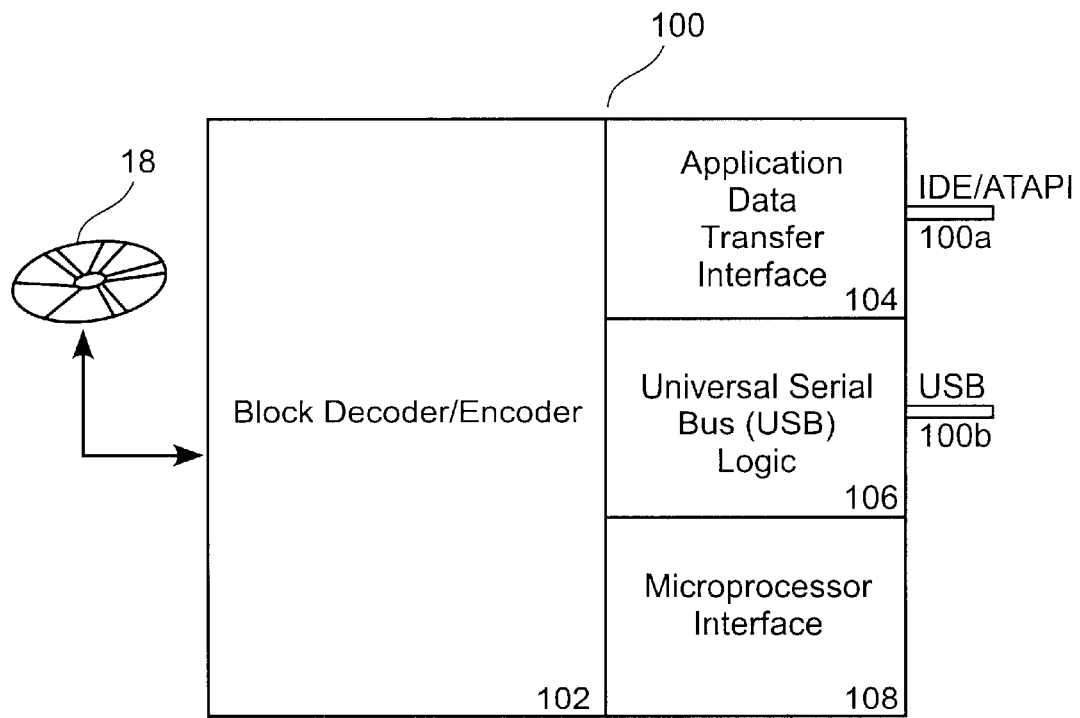
FIG. 2 shows a block diagram of controller circuitry that is capable of being operated in either an IDE/ATAPI mode or a USB mode, in accordance with one embodiment of the present invention.

FIG. 2 shows a block diagram of controller circuitry 100 that is capable of being operated in either an IDE/ATAPI mode or a USB mode, in accordance with one embodiment of the present invention. The controller circuitry 100 includes a block decoder/encoder 102 that is configured to communicate data to and from an optical storage media 18. The block decoder/encoder 102 is also configured to communicate with an application data transfer interface 104, a universal serial bus (USB) logic block 106, and a microprocessor interface 108. As used herein, the application data transfer interface 104 will also be referred to as an "ATAPI interface."

The application data transfer interface 104 is configured to provide connection to an IDE/ATAPI connection 100a, and the universal serial bus logic 106 is configured to provide connection to a USB connection 100b. As will be described in greater detail below, the circuitry implemented to carry out the data transfers in a USB mode will share logic circuitry that is typically only used for IDE/ATAPI data transfers in prior art systems. Accordingly, the USB logic 106 is a more compact design because less USB dedicated circuitry will be needed to carry out the USB data transfers. This will also enable the fabrication of smaller controller chips, which has the direct benefit of lowering manufacturing costs. In addition, because one controller chip is capable of being used in either an IDE/ATAPI mode and a USB mode, there will be fewer controller chip designs to support and update by a peripheral device manufacturer. Further yet, optical storage devices can be made smaller, and also be more easily embodied in portable devices, while reducing cost of design and manufacturing.

Accordingly, the controller chip 100 is capable of either operating in accordance with an IDE/ATAPI data transfer mode or the USB mode. Thus, the controller chip 100 can be implemented in either internal peripheral devices such as compact disc recordables (CD-RW), as well as external peripheral devices. By way of example, when the controller chip 100 is integrated into an internal peripheral device, the controller chip 100 can be made to operate in the IDE/ATAPI mode. Although specific examples provided herein are with reference to CD-RW devices, it should be understood that the controller chip 100 can be integrated into any optical storage device. Examples of such optical storage devices can also include, but are not limited to, CD-ROMs, CD-Rs, digital video discs (DVDs), and the like.

When the controller chip 100 is integrated into an external peripheral device, the controller chip 100 can be enabled to communicate in the USB mode, and the communication in the USB mode will be performed utilizing data transfer logic that is standard to the IDE/ATAPI circuitry. As such, the USB logic 106 is very compact logic circuitry that borrows logic from the ATAPI logic to perform the USB data transfers. As will be appreciated by those skilled in the art, the ability to have a controller chip 100 that can be integrated into either external and internal peripheral devices, while at the same time limiting the amount of USB-only dedicated circuitry in the controller chip, will provide for substantial cost savings to peripheral device manufacturers. This cost saving is primarily due to the compact nature of the circuitry implemented in the controller chip 100 and the fact that the same controller chip 100 can be integrated into either external or internal peripheral devices, even when they implement different data transfer protocols.

Figure 3:
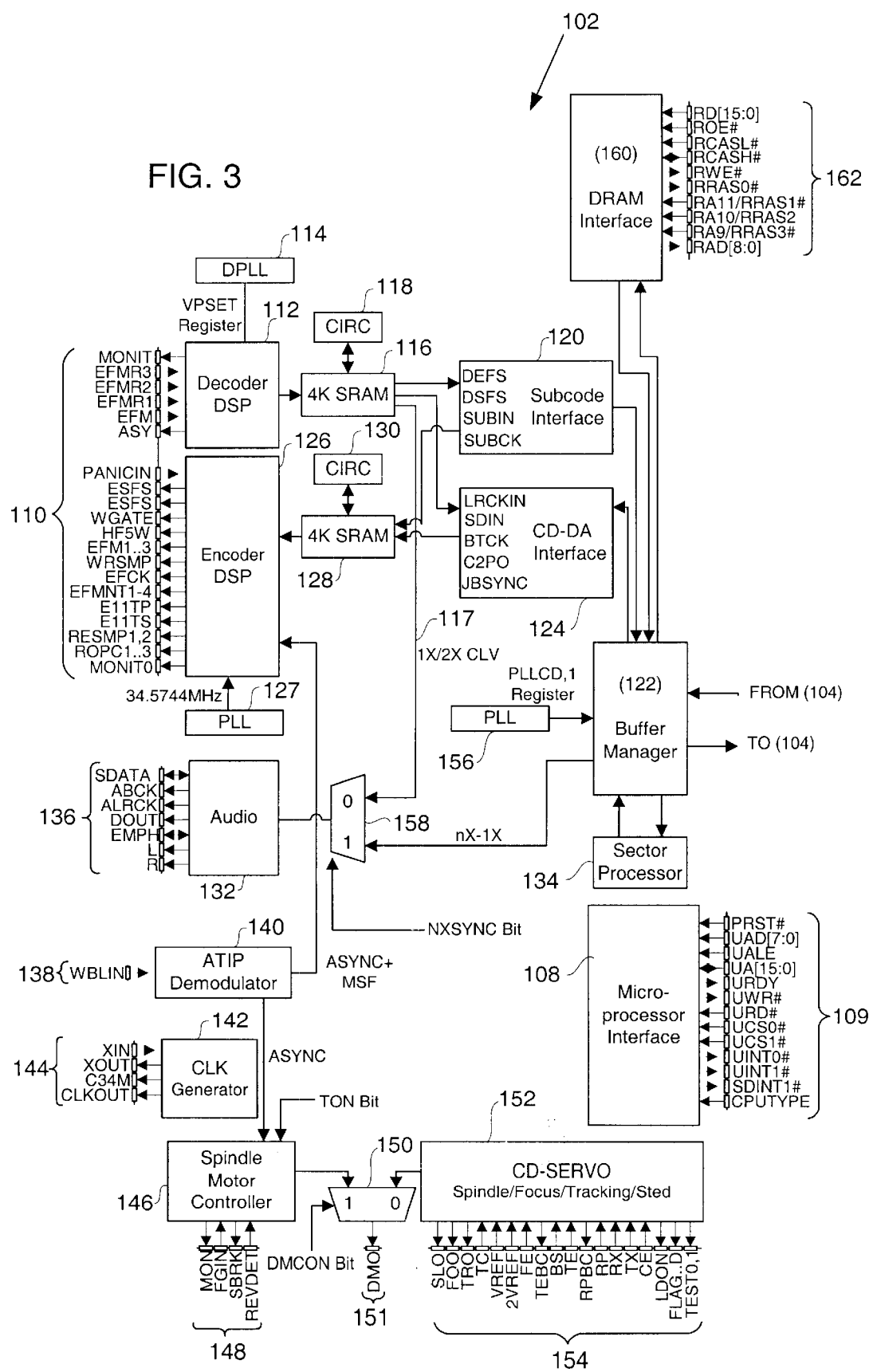
FIG. 3 illustrates in more detail the circuitry implemented by the block decoder/encoder, in accordance with one embodiment of the present invention.

FIG. 3 illustrates in more detail the circuitry implemented by the block decoder/encoder 102, in accordance with one embodiment of the present invention. As shown, a digital signal processor (DSP) of a decoder and an encoder, 112 and 126 respectively, are in communication with a plurality of pins 110. The plurality of pins 110 then communicate to analog circuitry that is configured to couple to a laser of the peripheral device for reading and writing data to and from the compact disc media. As mentioned above, the present disclosure provides specific examples related to optical disc peripheral devices (e.g., such as CD-RWs). However, it should be understood that the controller chip can be modified to work with any peripheral device to enable the shared logic advantages of the present invention.

In a specific example, during a read operation from an optical storage media 18, a decoder DSP 112 is configured to receive signals 110 and receive clock signals from an internal clock generator, such as a distal phase lock loop (DPLL) 114. The decoder DSP 112 then couples to a 4K RAM 116 that provides work space for error correction operations.

Block CIRC 118 is implemented for error correction and is suited for processing interleave data and code word generation. By way of example, CIRC 118 is configured to work on code words that consist of groups of 8 bits. The RAM 116 is coupled to a subcode interface 120 that has side-band information for the read path and decodes the subcode information coming off of the disc media.

The subcode interface 120 is also implemented during a writing operation. The subcode interface 120 is shown coupled to a buffer manager 122 that contains registers that have work space for the associated logic of the block decoder/encoder 102. The buffer manager 122 is also configured to communicate with a DRAM interface 160 which has external pins 162. The buffer manager 122 is also coupled to a phase lock loop (PLL) circuit 156. The buffer manager is in communication with a sector processor 134 that is configured to perform error correction and wrapping of raw data blocks. The sector processor is also configured to create or decode information for compact disc data (CD-DA) level information. A CD-DA interface 124 is configured to decode CD-ROM level information, such as user data or, if the disc has an executable program, perform the necessary decoding.

The CD-DA interface 124 is shown coupled to a 4K RAM 128. The RAM 128 is in communication with a CIRC 130 that provides codeword generation for the writing of data that is transferred to an encoder DSP 126, and then transferred to the laser for writing to the CD media. The encoder DSP 126 is also provided with a PLL 127. An audio block 132 is provided with pins 136 to communicate audio data to the peripheral device. The audio data of the peripheral device may be accessed by way of an audio jack on an external portion of a peripheral device. A user can then plug-in head phones for listening to audio data from the peripheral device.

A multiplexer 158 is provided to receive a path 117 from RAM 116 of audio data being decoded from the CD media. Also provided is a signal from the buffer manager 122 and a select signal (NXSYNC bit). When audio data is provided through path 117, the audio data is directed out to the audio block 132 at a 1x/2x speed. Alternatively, if audio data is provided from the buffer manager, the audio data is converted from nX to 1X and is then provided to the multiplexer 158 for output to the audio block 132 when appropriate.

An ATIP demodulator block 140 is also provided having a pin 138. The ATIP demodulator block 140 is configured to perform pre-groove demodulation, which enables reading of low-level encoding on an unrecorded disc media. The ATIP demodulator block 140 is in communication with the encoder DSP 126 and the spindle motor controller 146. The spindle motor controller 146 is configured to communicate with pins 148. Pins 148 therefore communicate with the motor that enables the spinning of the optical storage media 18. The spindle motor controller 146 communicates with the multiplexer 150 having a disc motor servo output (DMO) pin 151, and the CD servo unit 152 (i.e., spindle/focus/tracking/sled) also communicates with the multiplexer 150. The CD servo unit 152 communicates by way of pins 154 that control the movement of the laser. The decoder/encoder block 102 also includes a microprocessor interface 108 that has interconnection pins 109. Also shown is the buffer manager 122 in communication with the application data transfer interface 104. The application transfer interface 104 will be discussed in greater detail with respect to FIGS. 4 and 5 below.

To provide a more complete understanding of the respective signals shown in FIG. 3, reference can be made to Tables A through J, which are provided below. It should be understood however, that these signals are only exemplary and other signals may be added, subtracted, referenced by other conventions, or combined. However, the description of the signals will provide one of ordinary skill in the art with a more complete understanding of the functionality of the decoder/encoder block 102.

TABLE A

DECODER DSP (112)

| Pin Name | PIN TYPE | Comments |
|---|---|---|
| MONIT | O | Monitor Out for CD-DSP |
| EFMR3 | $1_A$ | EFM Analog Data Bias 3 |
| EFMR1 | $1_A$ | EFM Analog SR Bias 1 |
| EFM | $1_A$ | EFM Analog Data |
| ASY | $O_A$ | Asymmetric DAC Output |

TABLE B

ENCODER DSP (126)

| Pin Name | PIN TYPE | Comments |
|---|---|---|
| PANICIN | $I_S$ | Panic In |
| ESFS | O | EFM Subcode Frame Sync |
| EEFS | O | EFM Frame Sync |
| WGATE | O | Write Gate |
| HFSW | O | High Frequency Modulation Switch |
| EFM1 . . . 3 | O | EFM Out 1, EFM Out 2, EFM Out 3 |
| WRSMP | O | Write Level Sample |
| EFCK | O | EFM Bit Clock |
| EFMNT1–4 | O | EFM Pit Pattern Length Indicator |
| E11TP | O | EFM 11T Pit Pattern Indicator |
| E11TS | O | EFM 11T Pit Space Indicator |
| RESMP1.2 | O | Read Level Sample 1, Read Level Sample 2 |
| ROPC1 . . . 3 | O | Running OPC Sample and Hold 1, 2, and 3 |
| MONITO | O | Monitor Out for Encoder/Decoder |

TABLE C

AUDIO (132)

| Pin Name | PIN TYPE | Comments |
|---|---|---|
| SDATA | I/O | Audio Serial Data |
| ABCK | I/O | Audio Bit Clock |
| ALRCK | I/O | Audio Left/Right Clock |
| DOUT | I/O | Digital Audio Out |
| EMPH | I/O | Deemphasis Control |
| L | $O_A$ | Left Channel Audio Output |
| R | $O_A$ | Right Channel Audio Output |

TABLE D

ATIP DEMODULATOR (140)

| Pin Name | PIN TYPE | Comments |
|---|---|---|
| WBLIN | $I_S$ | Wobble In |

TABLE E

CLK GENERATOR (142)

| Pin Name | PIN TYPE | Comments |
|---|---|---|
| XIN | I | Crystal In: System Clock |
| XOUT | O | Crystal Out: System Clock |
| C34M | O | Clock Out: Set to 34.5744 MHz |
| CLKOUT | O | CD-DSP/Servo Clock Output: System Clock |

TABLE F

DRAM INTERFACE (160)

| Pin Name | PIN TYPE | Comments |
|---|---|---|
| RD[15:0] | $I/O_{PUA}$ | RAM Data: Data for DRAM Possible to set bus size (16 bit/8 bit) by setting internal registers |
| ROE# | I/O | Output Enable: OE for DRAM |
| RCASL# | O | COLUMN ADDRESS STROBE Low |
| RCASH# | O | Column Address Strobe High: CASO for DRAM If 16 bit bus is selected, this pin is used by strobe. |
| RWE# | I/O | Write Enable 0: WEO for DRAM Write strobe of RD [7:00] when 16 bit data bus is selected |
| RRASO# | O | Row Address Strobe 0: RAS for DRAM |
| RAD11/RRAS1# | O | DRAM Address Bus/RRAS1# |
| RAD10/RRAS2# | O | DRAM Address Bus/RRAS2# |
| RAD9/RRAS3# | O | DRAM Address Bus/RRAS3# |
| RAD[8:0] | O | DRAM Address Bus |

TABLE G

MICROPROCESSOR INTERFACE (108)

| Pin Name | PIN TYPE | Comments |
|---|---|---|
| PRST# | $I_S$ | Power On Reset |
| UAD[7:0] | I/O | Microcontroller Address/Data Bus |
| UALE | $I_S$ | Microcontroller Address Latch Enable |
| UA[15:0] | $I_L$ | Microcontroller Address Bus |
| URDY | $I/O_{PU}$ | Data Ready |
| UWR# | $I_S$ | Microcontroller Write Strobe |
| URD# | $I_S$ | Microcontroller Read Strobe |
| UCS0# | $I_S$ | Chip Select 0 for Registers |
| UCS1# | $I_S$ | Chip Select 1 for Buffer Memory |
| UINT0# | $I/O_{PU}$ | Decoder/Encoder Interrupt Request 0 |
| UINT1# | $I/O_{PU}$ | Decoder/Encoder Interrupt Request 1 |
| SDINT1# | $O_{PU}$ | Servo/CD-DSP Interrupt |
| CPUTYPE | $I_S$ | Motorola/Intel Microcontroller Selection |

TABLE H

CD-SERVO (152)
SPINDLE/FOCUS/TRACKING/SLED

| Pin Name | PIN TYPE | Comments |
|---|---|---|
| SLO | $O_A$ | Feed Motor Output |
| FOO | $O_A$ | Focus Servo Output |
| TRO | $O_A$ | Tracking Servo Output |
| TC | $I_A$ | Track Count Input |
| VREF | $I_A$ | Reference Voltage Volts |
| 2VREF | $I_A$ | 2X Reference Voltage 4.2 Volts |
| FE | $I_A$ | Focus Error |
| TEBC | $O_A$ | Tracking Error Balance Control |
| BS | $I_A$ | Beam Strength |
| TE | $I_A$ | Tracking Error |
| RPBC | $O_A$ | Ripple Balance Control |
| RP | $I_A$ | Ripple of RF |
| RX | $I_S$ | RP Zero Crossing |

TABLE H-continued

CD-SERVO (152)
SPINDLE/FOCUS/TRACKING/SLED

| Pin Name | PIN TYPE | Comments |
|---|---|---|
| TX | $I_S$ | TE Zero Crossing |
| CE | $I_A$ | Center Position Error |
| LDON | O | Laser Diode On |
| FLAGA . . . D | O | Servo Monitor Flag A through Flag D: FLAGA through FLAGD is used to output one of four internal servo signals. FLAGA through FLAGD can also be used as general output ports. |
| TEST0.1 | I/O | Factory Test: Must be ground for normal operation |

TABLE I

SPINDLE MOTOR CONTROLLER (146)

| Pin Name | PIN TYPE | Comments |
|---|---|---|
| MON | O | Motor Drive On: Enables spindle motor drive |
| FGIN | I | FG IN: HG (tachometer) pulse input |
| SBRK | O | Short Brake: Stops spindle motor by applying a short pulse to the motor winding |
| REVDET | $I_S$ | Reverse Detect Motor Drive: Indicates spindle motor is rotating in reverse direction |

TABLE J

MULTIPLEXER (150)

| Pin Name | PIN TYPE | Comments |
|---|---|---|
| DMCON Bit | | Mux Select Signal |
| DMO | $O_A$ | Disc Motor Servo Output |

TABLE K

ATAPI INTERFACE (104)

| Pin Name | Pin Type | Description |
|---|---|---|
| HRST# | $I_S$ | ATA Host Reset: ATA drive reset |
| HA2 | $I_S$ | ATA Host Address: Address signals/USB 48 MHz clock |
| HA1 | | |
| HA0/48M | | |
| HD15 | $I/O_{PUB}$ | ATA Host Data Bus/SCSI Controller Data Bus |
| HD14 | | |
| HD13 | | |
| HD12 | | |
| HD11 | | |
| HD10 | | |
| HD9 | | |
| HD8 | | |
| HD7 | | |
| HD6 | | |
| HD5 | | |
| HD4 | | |
| HD3 | | |
| HD2 | | |
| HD1 | | |
| HD0 | | |
| CS1FX#/ USBD + | $I_S$ | ATA Host Chip Select 1FX, 3FX/USB D+, D-differential I/O data |
| CS3FX#/ USBD- | | |
| IOCS16# | $O_{OD}$ | ATA 16-BIT I/O |
| HIRQ | I/O | ATA Host Interrupt Request/SCSI Controller Interrupt Request |
| HDASP# | $I/O_{PUB}$ | ATA Host Interface |

TABLE K-continued

ATAPI INTERFACE (104)

| Pin Name | Pin Type | Description |
|---|---|---|
| HPDIAG# | $I/O_{PUB}$ | ATA Host Interface |
| HDRQ | O | ATA DMA Request/DMA Acknowledge: ATAPI DMA request DMA acknowledge when connected to SCSI controller |
| DMACK# | I/O | ATA DMA Acknowledge/DMA Request: ATAPI DMA acknowledge DMA request when connected to SCSI controller |
| IORDY | $O_{TS}$ | ATA Host I/O Ready: I/O channel ready |
| HRD# | $I/O_{PUA}$ | ATA Host Read Strobe/SCSI DMA Read Strobe |
| HWR# | $I/O_{PUA}$ | ATA Host Write Strobe/SCSI DMA Write Strobe |
| ARST | $O_{TS}$ | ATAPI Reset |

Table L below provides the pin type definitions for the pins described with reference to Tables A–K.

TABLE L

PIN TYPE DEFINITIONS

| Type | Definition |
|---|---|
| $I_L$ | TTL Input |
| $I_S$ | TTL Input with Schmitt Trigger |
| O | Digital Output |
| $O_{OD}$ | Digital Open Drain Output |
| $O_{TS}$ | Digital Tri-state Output |
| I/O | TTL Input/Output |
| $I/O_S$ | TTL Input/Output with Schmitt Trigger Input |
| $I/O_{PUA}$ | TTL Input/Output with Weak Pull-up |
| $I/O_{PUB}$ | TTL Input/Output with Strong Pull-up |
| $I/O_{TS}$ | TTL Input/Output Tri-state Pin |
| $I_A$ | Analog Input |
| $O_A$ | Analog Output |

Figure 4:
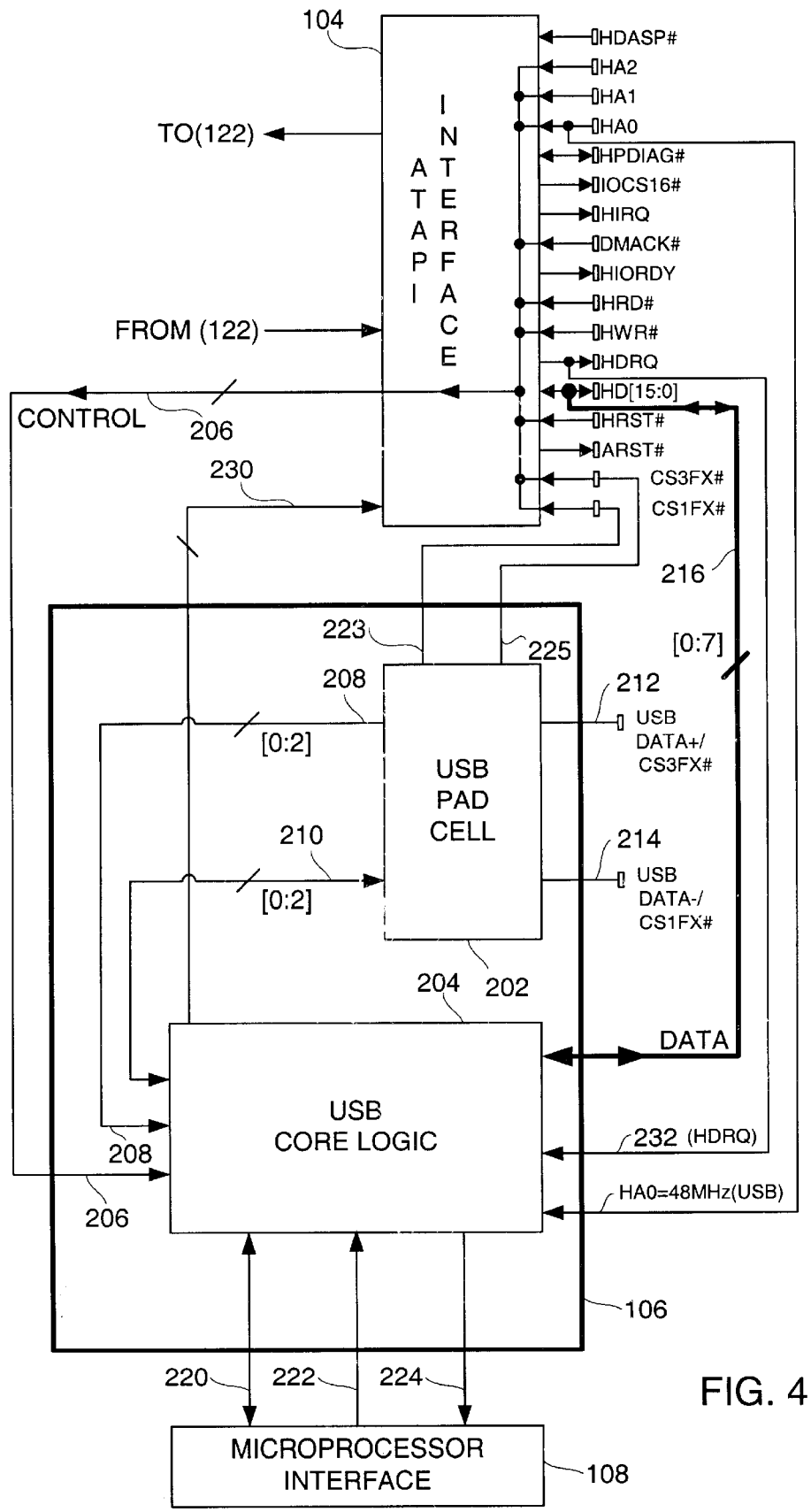
FIG. 4 illustrates a more detailed block diagram of the application data transfer interface and the universal serial bus logic, in accordance with one embodiment of the present invention.

Referring now to FIG. 4, a more detailed block diagram of the Application Data 10 Transfer Interface 104 (i.e., ATAPI interface) is provided along with the universal serial bus logic 106. In this embodiment, the ATAPI interface 104 is shown in communication with the buffer manager 122 of FIG. 3. The ATAPI interface 104 also includes a plurality of pins which are configured to connect up to an IDE cable for transferring data to and from a host computer system. As shown, the pins include HDASP#, HA2, HA1, HA0, HPDIAG#, IOCS16#, HRRQ, DMACK#, HIORDY, HRD#, HWR#, HDRQ, HD[15:0], HRST#, ARST#, CS3FX#, and CS1FX#. These signals are defined in more detail in Table K.

As mentioned above, the USB logic 106 is configured to provide the controller 100 of FIG. 2 with the ability to function in either an IDE/ATAPI mode, or in a USB mode, depending upon what type of peripheral device the controller 100 is integrated with. The ATAPI interface 104 is shown in communication with a USB pad cell 202 by way of communication lines 223 and 225. Communication lines 223 and 225 connect to pins CS1FX# and CS3FX#, respectively. The USB pad cell 202 of the USB logic 106 is configured to provide an interface to a USB cable, for example, for providing data to and from a host computer system when in USB mode.

By way of example, the USB pad cell 202 has connections 212 and 214 for providing data to and from a host computer system by way of a USB cable. Connection 212 is shown for use with USB data+(DP) and is also part of pin CS3FX#. Connection 214 is configured for USB data–(DM) and is also configured to provide connection to CS1FX#. The USB pad cell 202 is also shown in communication with USB core logic 204. The communication with USB core logic 204 is by way of a bus 208 and a bus 210. In one embodiment, bus 208 is a 3-bit data bus that is configured to provide data received from a host computer through the USB cable to the USB core logic 204. The USB core logic 204 also communicates back to the USB pad cell by way of bus 210, which, in one embodiment, is also a 3-bit bus. The ATAPI interface 104 is also in communication with the USB core logic 204 by way of a bus 206.

When in USB mode, bus 206 is configured to provide a plurality of control signals from the ATAPI interface 104 to the USB core logic 204. Accordingly, bus 206 borrows signal circuitry from a plurality of the pins used in the ATAPI interface 104. These control signals 206 are therefore implemented by the USB logic 106 to perform data transfers during USB mode operation. Accordingly, the USB logic 106 is in essence, borrowing control signals from the ATAPI interface 104 to perform the USB data transfers without requiring additional USB-only logic circuitry in the USB logic 106.

Also shown is a bi-directional data bus 216, which is coupled between the ATAPI interface 104 and the USB core logic 204. The bus 216 is, in one embodiment, an 8-bit bus [0:7] that couples to a 16-bit data bus that is in communication with the ATAPI interface 104. The USB core logic 204 also makes use of the HDRQ signal 232 that is provided by the ATAPI interface 104. HDRQ signal 232 will inform the USB core logic 204 when data is available for a particular data transfer.

When the controller 100 is in the USB mode, the HA0 signal will provide the USB core logic with a 48 MHz clock input. Also, the CS3FX# pin and the CS1FX# will become USB Data+/− signals. At a higher level, the microprocessor controlling the controller 100 can provide a signal to switch the controller 100 to either be in an IDE/ATAPI mode or in the USB mode. The USB core logic 204 is also shown communicating with the ATAPI interface by way of a signals 230. In this embodiment, the signals 230 are those identified in FIG. 6, as the ATAPI PADS, which are part of the ATAPI interface 104. When in the ATAPI mode, these signals are driven in a normal ATAPI manner, however, when in the USB mode these ATAPI signals are modified for use in the USB mode. Finally, the USB core logic 204 is also configured to communicate with the microprocessor interface 108, by way of a bi-directional bus 220, control signals 222, and an interrupt signal 224. Signal 220 is a bus, which in this embodiment is an 8 bit wide bus that communicates with the microprocessor interface 108. Signal 222 on the other hand can be a microprocessor interface read/write signal.

Figure 5:
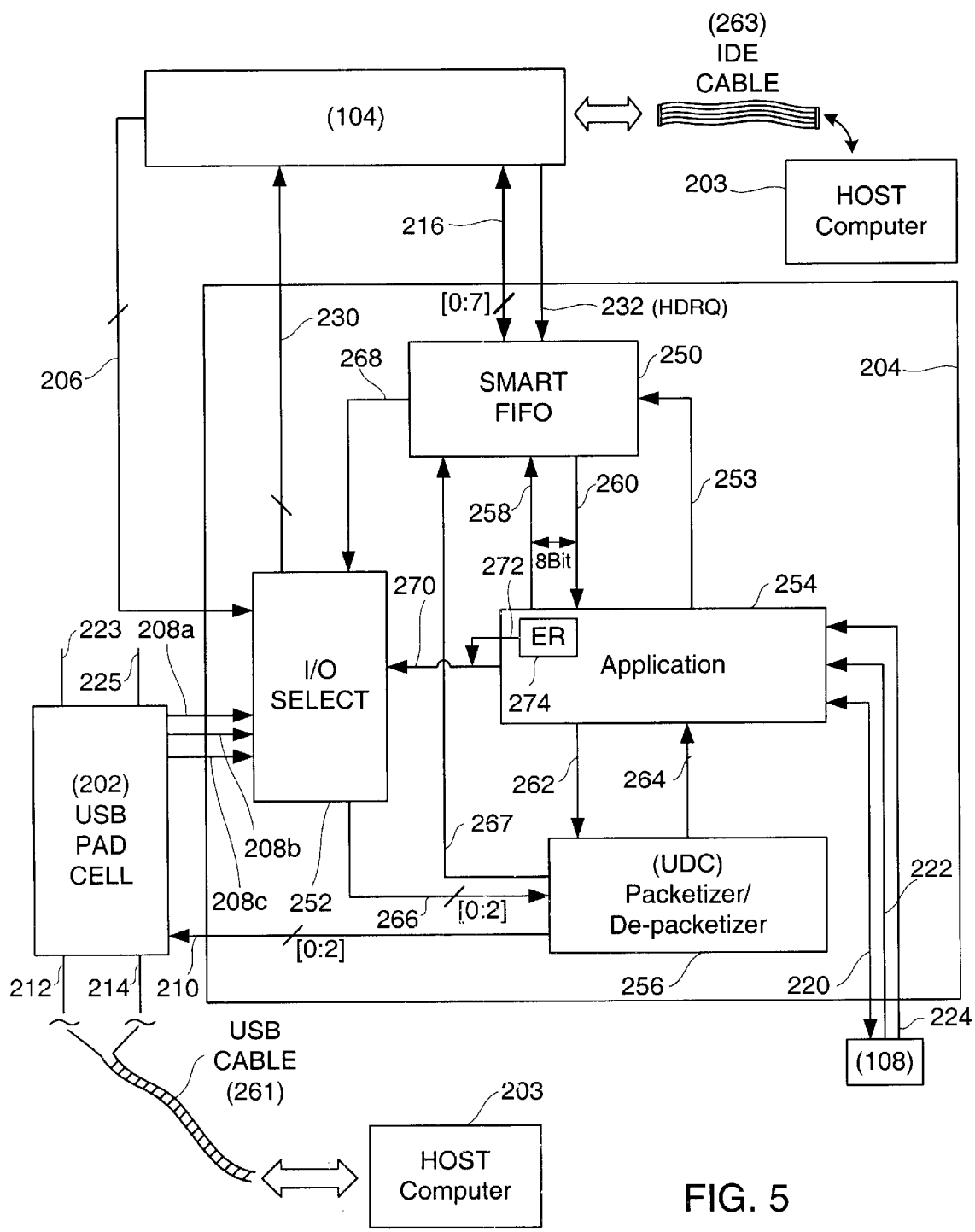
FIG. 5 illustrates a more detailed block diagram of the USB core logic of FIG. 4, in accordance with one embodiment of the present invention.

FIG. 5 illustrates a more detailed block diagram of the USB core logic 204 of FIG. 4, in accordance with one embodiment of the present invention. The USB core logic 204 is configured to include a smart FIFO 250, an I/O select 252, an application 254, and a USB device controller (UDC) 256. In this embodiment, the smart FIFO 250 is in communication with the ATAPI interface 104 by way of data bus 216, which was described above to be an 8-bit bus. The ATAPI interface 104 is configured to communicate signal 232 HDRQ to the smart FIFO 250. The smart FIFO 250 is in communication with the I/O select 252 by way of control signals 268. Control signals 268 are configured to provide read/write control to the I/O select. The read/write control is initially transferred through the application 254 to the smart FIFO 250 by way of control signals 253.

The smart FIFO 250 is also in communication with the application 254 by way of an 8-bit bus illustrated as 258 and 260. The application 254 will include an enable register (ER) 274 that will signal to line 270 when the controller 100 should be placed into the USB mode. The I/O select will then appropriately set the circuitry to be in either the ATAPI mode or the USB mode depending upon the setting of the enable register within the application 254. The ER 274 will be set by a microprocessor that interfaces through the microprocessor 108. The application 254 is also in communication with the UDC 256 that is configured to perform packetizing and de-packetizing (e.g., otherwise known as de-serializing and serializing) of data that is being either transferred in or out by way of the USB pad cell 202. This packetizing is thus performed in accordance with the requirements of the USB specification.

When data is being transferred in through the USB pad cell 202, the data is passed through a 3-bit bus that is identified as lines 208a, 208b, and 208c, which are provided to the I/O select 252. Data that is provided by the USB pad cell 202 through the I/O select 252 is transferred to the UDC 256 by way of bus 266, that is also a 3-bit bus, in one embodiment. Data transferred out of the packetizer and to the USB pad cell 202 is transferred over bus 210, which is a 3-bit bus in this embodiment. Signal 267 is configured to inform the smart FIFO 250 when a packet has, in fact, been successfully transferred. Until a packet is successfully transferred, the data stored in the smart FIFO 250 will not be erased, thus being maintained in case a re-send or re-receive of a failed transfer is required.

The application 254 is in communication with the microprocessor 108 by way of signals 220, 222, and 224 as described above. As mentioned earlier, the ATAPI interface 104 provides control signals 206 to the USB core logic 204 by way of the I/O select 252. Accordingly, when the controller chip 100 is functioning in the USB mode, the USB core logic 204 will implement and borrow control signals from the ATAPI interface 104. These signals being borrowed from the ATAPI interface 104 are signals that would otherwise have to be custom integrated into standalone USB logic.

However, embodiments of the present invention enable the shared integration of such control signals implemented for ATAPI data transfers. The USB pad cell 202 is shown having connections 212 and 214 which provide connection to a USB cable 261. The USB cable 261 is configured to communicate with a host computer 203. The host computer can then request to write data to a CD media, or read data from the CD media by way of the same USB cable 261. It should be borne in mind that the present invention is applicable to peripheral devices other than CD media-type devices.

If the controller chip 100 is implemented to function in the IDE/ATAPI mode, then the ATAPI interface 104 will provide connection to, for example, an IDE cable 263 that can communicate to the host computer 203. In either event, the enable register (ER) that is part of the application 254 can be placed in an OFF state when ATAPI mode operation is desired. As described in greater detail in Appendix A, the enable register (R) is identified as "USBENBL." When set to 1, the USB mode is enabled for a USB data transfer through the USB core logic 204. When set to 0, the ATAPI mode is enabled and USBCLK4X is disabled in the application 254. The default state of the enable register (ER) is 0 following hardware reset. Enable register (ER) determines which signals are driven off the chip on the common USB/ATAPI pins. The enable register also selects the ATAPI input pins or the USB logic data outputs to be driven to the block decoder/encoder 102. For more information on the enable register, reference should be made to the USB Control 2 Register, which is defined in Appendix A.

Once the enable register is set, a signal 270 is transferred from the application 254 to the I/O select 252. Reference is now made to FIG. 6, wherein selected control signals of the ATAPI interface 104 are selectively used to enable USB mode data transfers. The control signals 206 are also shown in FIG. 4. In this exemplary embodiment, HA2, HA1, and HA0 are set to logic level zero, which selects the data port. Signals DMACK#, HRD#, and HWR#, are set by way of smart FIFO 250. In this manner, these signals control data transfers for USB mode using ATAPI logic. In essence, signals DMACK#, HRD#, and HWR# fool the ATAPI logic into believing that it is performing an ATAPI data transfer, when in fact, the transfer is a USB data transfer. To complete USB mode operation, signal HRST# is set to a logic one, which places the signal inactive. Signals CS3FX# and CS1FX# are set to logic one and zero, respectively. Signals CS3FX# and CS1FX# therefore choose the data port.

In another embodiment of the present invention, verilog code is implemented to functionally define the setting of the controller 100 in either the USB mode or the ATAPI mode. Table L provides exemplary verilog code, which defines the setting of the controller 100 in the desired mode. It should be understood that the following code is only exemplary, and other suitable code may also be implemented to carry out the setting of the controller 100. In general, the settings are communicated by way of signals 206, which shows communication of such signals 206 to the I/O select 252 of FIG. 5.

TABLE L

```
Begin
    if ((usb_en == 1))                USB Mode
    begin
        xvr_data <= usb_xvr_data;
        d_pls <= usb_d_pls;
        d_mns <= usb_d_mns;
        usb_hiwr_b <= app_wr_b;
        usb_hird_b <= app_rd_b;
        usb_hirst_b <= app_hrst_b;
        usb_hidmack_b <= app_dmack_b;
        hdce_b <= 1;
        usb_hia <= 3'b000;
        usb_hics1_b <= 0;
        usb_hics3_b <= 1;
        usb_tx_enbl <= udc_txenl;
    end
    begin                              ATAPI Mode
        xvr_data <= 0;
        d_pls <= 0;
        xvr_data <= 0;
        d_pls <= 0;
        d_mns <= 0;
        usb_hiwr_b <= hiwr_b;
        usb_hird_b <= hird_b;
        usb_hirst_b <= hirst_b;
        usb_hidmack_b <= hidmack_b;
        hdce_b <= blk_dec_hdce_b;
        usb_hia <= hia;
        usb_hics1_b <= hics1_b;
        usb_hics3_b <= hics3_b;
        usb_tx_enbl <= 1;
    end
```

Figure 7:
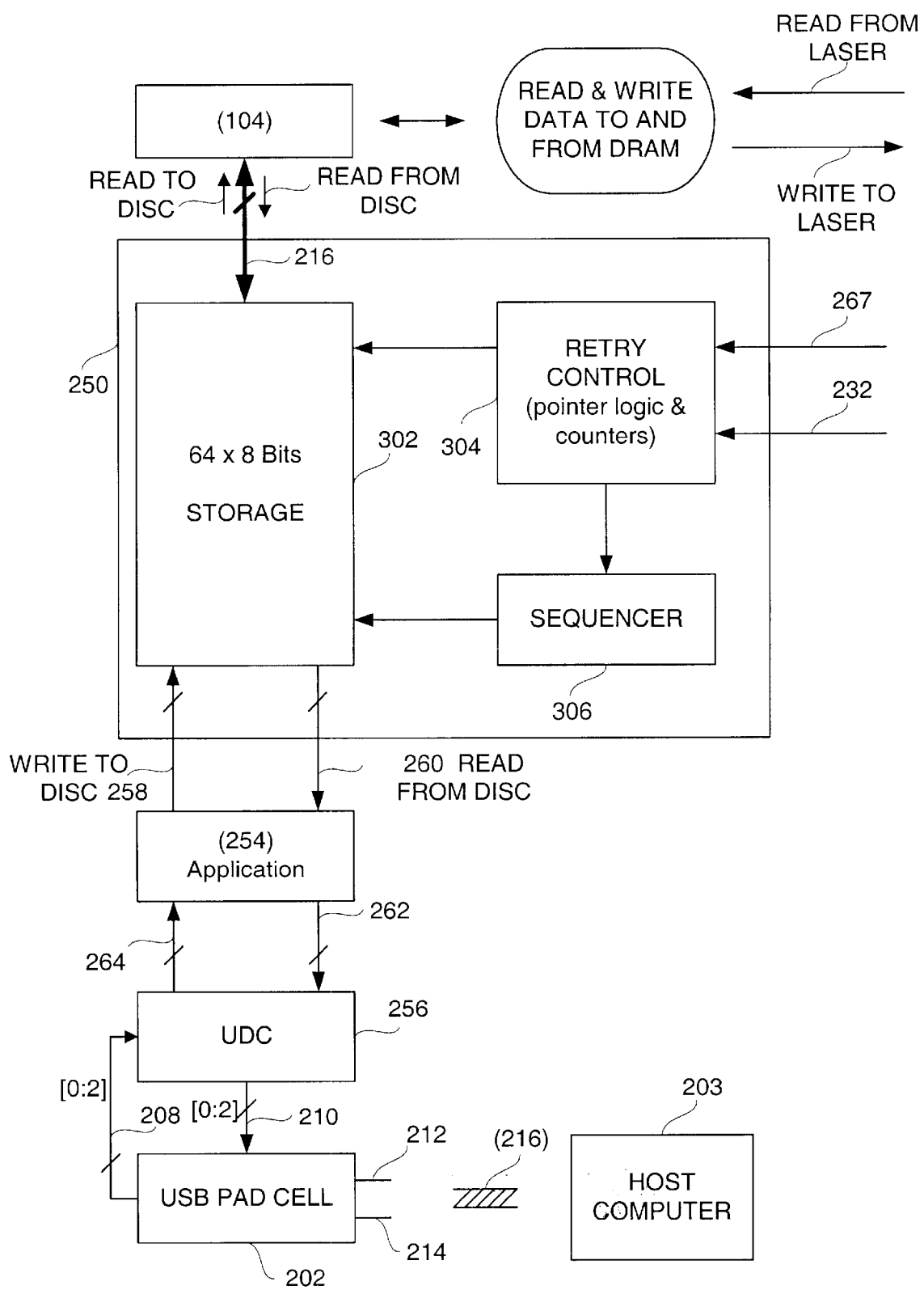
FIG. 7 illustrates a more detailed block diagram of the smart FIFO of FIG. 5, in accordance with one embodiment of the present invention.

FIG. 7 illustrates a more detailed block diagram of the smart FIFO 250, in accordance with one embodiment of the present invention. The smart FIFO 250 includes storage 302, which in this embodiment is a 64-by-8-bit addressable buffer. Of course, other suitable buffer types and sizes may also work. The storage 302 is in communication with a retry control 304, which contains pointer logic and counters for accessing the storage 302. As mentioned above, signal 267 is provided by the UDC 256 of FIG. 5 and is configured to inform the retry control when a packet has been successfully transferred. If the packet has not been successfully transferred, signal 267 will inform the retry control 304 which will then re-send or re-receive the packet that is stored in the storage 302. The retry control is also coupled to a sequencer 306, which coordinates the sequencing of packet data being transferred by way of the storage 302.

For discussion purposes, the block diagram of FIG. 7 will now be discussed with reference to performing writing of data to an optical storage media or reading data from the optical storage media. In general, a host computer system 203 can communicate to the USB pad cell 202 by way of a USB cable 261. When a write of data from the host computer 203 is desired, the data is transferred over the USB cable 261 and to the USB pad cell 202 by way of connections 212 and 214. Connections 212 and 214, which operate as Data+ and Data−, are defined in greater detail in Chapter 7 of the USB Specification, which was incorporated by reference herein. The USB pad cell will then transfer the data by way of bus 208 that is, in this embodiment, a 3-bit bus. The data is transferred to the UDC 256 where the data is packetized (e.g., de-serialized) and transferred through line 264. The data is then transferred from the application 254 to the storage 302 by way of bus 258.

The data can then be transferred from the storage 302 implementing the retry control 304 and sequencer 306 to the ATAPI interface 104. Once the data is transferred to the ATAPI interface 104, the ATAPI interface 104 can then transmit the data to DRAM (not shown) by way of the DRAM interface 160 of FIG. 3, which is then transferred from the DRAM to the laser for writing.

When a read is requested by the host computer 203, the request is transferred through the USB cable 261 and transmitted to the USB pad cell 202. The data is then read from the CD media using the laser and then transferred to DRAM by way of DRAM interface 106 of the controller 100. The data is then transferred to the ATAPI interface 104 which is communicated to the storage 302 by way of bus 216. Once the data is stored in the storage 302, the data is transferred to the application 254 by way of bus 260. From the application 254, the data is transferred to bus 262 and then to the UDC 256 where the data is de-packetized (e.g., serialized) and sent to the USB pad cell 202. From the USB pad cell 202, the data is transferred over the USB bus 261 to the host computer 203.

It is again emphasized that the embodiments of the present invention, namely the ability of USB logic to share IDE/ATAPI logic to complete USB data transfer tasks is not limited to optical disc applications that include CD-R devices, CD-ROM devices, CD-RW devices, and the like. To the contrary, the embodiments claimed herein can apply to any USB device, which can be embodied in any number of peripheral devices, either internal or external.

Appendix A provides a more detailed description of registers implemented in the Application 254 of the USB core logic 204, in accordance with one embodiment of the present invention. The registers that define the functionality of the application 254 are, in this embodiment, triggered by a microprocessor that communicates with the controller 100 by way of microprocessor interface 108.

APPENDIX A
MICROPROCESSOR REGISTERS

Address space for the USB block microprocessor registers begin at 0A0h, and has 16 locations of which 14 are defined.

A. USBINT0 - USB Interrupt 0 Register

| Addr | Type | Name | Bit 7 | Bit 6 | Bit 5 | Bit 4 | Bit 3 | Bit 2 | Bit 1 | Bit 0 |
|---|---|---|---|---|---|---|---|---|---|---|
| 0A0h | R | USBINT0 | STALLED | BLKXFRERR | CNTLXFRERR | 0 | MSBORST | CSWCMPLT | XFRCMPLT | CBWRCVD |
|  | W | USBINT0 | 0 | BLKXFRERR | CNTLXFRERR | 0 | MSBORST | CSWCMPLT | XFRCMPLT | CBWRCVD |

Each bit in this register provides a unique interrupt reason for USB transactions, as defined for a Mass Storage Class device. The USB Mass Storage Class, Bulk-Only Transport Specification, Revision 1.0 (1999), is hereby incorporated by reference.

For each interrupt bit in this register, there is a corresponding mask bit in USBINTEN0 (0A2h) that disables this bit from driving USBUINT0B or USBUINT1B on the microprocessor interface 108. An interrupt is cleared by writing a 0 to the bit. This register is initialized by hardware reset or setting USB Reset in the CMDCODE field of the USBCNTL1 Register (0A6h).

Bit 7 (R)—STALLED

This bit is set when CNTLSTALLED, BULKIN-STALLED or BULKOUTSTALLED bits are set in the USBERR Register (0A5h). Reset when these bits are not set.

Bit 7 (W)—Reserved

Bit 6 (R/W)—BLKXFRERR—Block Transfer Error

This bit is set when the USB Block sets a XFRLGTHERR, FIFOERR, or BULKDIRERR in the USBERR Register (0A5h).

1: Interrupt
0: No Interrupt

Bit 5 (R/W)—CNTLXFRERR—Control Transfer Error

This bit is set when the USB Block sets a FIFOERR in the USBERR Register (0A5h) during a Control-In transfer.

1: Interrupt
0: No Interrupt

Bit 4 (R/W)—Reserved

Bit 3 (R/W)—MSBORST—Mass Storage Class Bulk-Only Reset

The USB block has received a Mass Storage Class Bulk-Only reset.

1: Interrupt
0: No Interrupt

Bit 2 (R/W)—CSWCMPLT—CSW Complete

When CSW is set in the CMDCODE field of the USB-CNTL1 Register (0A6h.4 to 0A6h.0), this bit is set after the USB Block has finished sending the CSW packet on Bulk-In pipe and receiving the associated ACK packet from the host.

1: Interrupt
0: No Interrupt

Bit 1 (R/W)—XFRCMPLT—Transfer Complete

This bit is set when the USB Block has finished sending or receiving data for the current Bulk-In, Bulk-Out, or Control-In transfer. In Bulk-In or Control-In transfer, all packets are eventually acknowledged by the host. In Bulk-Out tranfers, all packets are eventually received correctly, acknowledge handshakes sent to the host, and all data transferred to the Block Decoder.

1: Interrupt
0: No Interrupt

Bit 0 (R/W)—CBWRCVD—CBW Packet Received

While in the "Wait for CBW" state, the USB block has received a CBW packet on the Bulk-Out endpoint, as set by firmware in the CMDCODE bits of the USBCNTL1 Register (0A6h.4 to 0A6h.0).

1: Interrupt
0: No Interrupt

B. USBINT1 - USB Interupt 1 Register

| Addr | Type | Name | Bit 7 | Bit 6 | Bit 5 | Bit 4 | Bit 3 | Bit 2 | Bit 1 | Bit 0 |
|---|---|---|---|---|---|---|---|---|---|---|
| 0A1h | R/W | USBINT1 | 0 | 0 | 0 | UDCNACKI | USBGETDEV | USBGETCFG | USBGETSTR | USBSUSP |

Each bit in this register provides a unique interrupt reason for certain USB transactions and events. For each interrupt bit in this register, there is a corresponding mask bit in USBINTEN1 (0A3h) that disables this bit from driving USBUINT0B or USBUINT1B on the microprocessor interface. An interrupt is cleared by writing a 0 to the bit.

This register is initialized by hardware reset or setting USB Reset in the CMDCODE field of the USBCNTL1 Register (0A6h.4 to 0A6h. 1).

Bits 7,6, & 5 (R/W)—Reserved

Bit 4 (R/W)—UDCNACK—UDCN Acknowledge

This bit is set when a USB transfer is active 0A6.A=1) and the data transfer has started and the current packet has a transfer error. This interrupt can be used to count retries on the USB bus.

1: Interrupt
0: No Interrupt

Bit 3 (R/W)—USBGETDEV—USB Get Device Descriptor

The USB block has received a Get Device Descriptor standard command from the USB.

1: Interrupt
0: No Interrupt

Bit 2 (R/W)—USBGETCFG—USB Get Configuration Descriptor

The USB block has received a Get Configuration Descriptor standard command from the USB.

1: Interrupt
0: No Interrupt

Bit 1 (R/W)—USBGETSTR—USB Get String Descriptor

The USB block has received a Get String Descriptor standard command from the USB. The target string descriptor is indicated by the STRINDEX bits in the USBSTAT Register (0A4h.3,2).

1: Interrupt

0: No Interrupt
Bit 0 (R/W)—USBSUSP—USB Suspend
USB block has detected an idle state or suspend on the USB.
1: Interrupt
0: No Interrupt field of the USBCNTL1 Register (0A6h.4 to 0A6h.0). This register is read/clear.
Bit 7 (R/W)—CBWLEQ0—CBW Length Equals 0
When "Wait for CBW" is set in the CMDCODE field of the USBCNTL1 Register (0A6h.4 to 0A6h.0), this bit is set if the USB Block detects that the CBWDATATRANSFERLENGTH field in the CBW (received from the USB) is equal to 0.
1: Condition occurred
0: Condition did not occur
Bit 6 (R/W)—CBWDIR—CBW Direction Transfer
When "Wait for CBW" is set in the CMDCODE field of the USBCNTL1 Register (0A6h.4 to 0A6h.0), this bit is set if bit 7 in the CBWFLAGS field of the CBW is set to 1, indicating a data-in transfer (device to host). This bit is reset, if bit 7 in the CBWFLAGS field is set to 0, indicating a data-out transfer (host to device).
1: Condition occurred
0: Condition did not occur
Bit 5 (R/W)—UDCNACK—UDCN Acknowledge

| | | C. USBINTEN0 - USB Interupt Enable 0 Register | | | | | | | | |
|---|---|---|---|---|---|---|---|---|---|---|
| Addr | Type | Name | Bit 7 | Bit 6 | Bit 5 | *Bit 4 | Bit 3 | Bit 2 | Bit 1 | Bit 0 |
| 0A2h | R/W | USBINTEN0 | | | | USBINTEN0 (7–0) | | | | |

This register enables corresponding bits in the USBINT0 Register (0A0h) to assert USBUINT0B or USBUINT1B on the microprocessor interface 108. Each bit enables the corresponding defined bit position in the USBINT0 from asserting the interrupt. These bits do not enable or disable the interrupt reason bit from being set in the USBINT0 Register (0A0h). Preferably, this register is initialized by hardware reset or setting USB Reset in the CMDCODE field of the USBCNTL1 Register (0A6h.4 to 0A6h.0). *Bit 4, in this embodiment, should be set to 0.
Bits 7 through 0 (R/W)—USBINTEN0—USB Interrupt Enable 0
1: Enable
0: Disable

| | | C. USBINTEN1 - USB Interrupt Enable 1 Register | | | | | | | | |
|---|---|---|---|---|---|---|---|---|---|---|
| Addr | Type | Name | Bit 7 | Bit 6 | Bit 5 | Bit 4 | Bit 3 | Bit 2 | Bit 1 | Bit 0 |
| 0A3h | R/W | USBINTEN1 | 0 | 0 | 0 | | USBINTEN1(40) | | | |

This register enables corresponding bits in the USBINT1 Register (0A1h) to assert USBUINT0B or USBUINT1B on the microprocessor interface 108. Each bit enables the corresponding defined bit position in the USBINT1 Register to assert the interrupt. These bits do not enable or disable the interrupt reason bit from being set in the USBINT1 Register.
This register is initialized by hardware reset or setting USB Reset, in the CMDCODE field of the USBCNTL1 Register (0A6h.4 to 0A6h.0).
Bits 7,6, & 5 (R/W)—Reserved
Bits 4,3,2, 1, & 0 (R/W)—USBINTEN1—USB Interrupt Enable 1
1: Enables
0: Disables This bit is set when any USB transaction or stage has resulted in the UDC block asserting UDCXFRNACK on the UDC/Application interface, internal to the USB block. Reset when the next transfer begins on this interface (UDCAS asserted). Note that this bit can be active when the UDCNACKI bit (0A1h.4) is inactive.
1: Condition occurred
0: Condition did not occur
Bit 4 (R/W)—UDCACK—UDC Acknowledge
This bit is set when a USB transaction or stage has resulted in the UDC block asserting UDCXFRACK, on the UDC/Application interface, internal to the USB block. Reset when the next transfer begins on this interface (UDCAS asserted).

| | | D. USBSTAT - USB Status Register | | | | | | | | |
|---|---|---|---|---|---|---|---|---|---|---|
| Addr | Type | Name | Bit 7 | Bit 6 | Bit 5 | Bit 4 | Bit 3 | Bit 2 | Bit 1 | Bit 0 |
| 0A4h | R/W | USBSTAT | CBWLEQ0 | CBWDIR | UDCNACK | UDCACK | STRINDEX | | EPNUM | |

This register provides real time status for certain events associated with USB transactions. This register is initialized by hardware reset or setting USB Reset in the CMDCODE 1: Condition occurred
0: Condition did not occur
Bits 3 & 2 (R/W)—STRINDEX—String Index These bits contain string number (0–3) associated with the USBGETSTR bit set in the USBINT1 Register (0A1h.1). A value of 0 points to String Index 0, 1 points to the Manufacturer String, and so on.
11: String 3
10: String 2
01: String 1
00: String 0

Bits 1 & 0 (R/W)—EPNUM—Endpoint Number

This field indicates the endpoint number, if any, associated with the most recent USB token phase.
11: Unused
10: Endpoint 2—Bulk-Out
1: Endpoint 1—Bulk In
00: Endpoint 0—Control if the USB Block detects that the CBW received from the USB is not equal to 31 bytes in length. This bit sets the BLKXFRERR bit, in the USBINT0 Register (0A0h.6).

Bit 2 (R/W)—FIFOERR—FIFO Error

A Block Decoder FIFO under/overrun occurred during Bulk-In, Bulk-Out, or Control-In data transfer. This bit sets the BLKXFRERR and CNTLXFRERR bits in the USBINT0 Register (0A0h.6) and (0A0h.5).

Bit 1 (R/W)—XFRLERR—Transfer Length Error

This bit is set during a Bulk-In or Bulk-Out data transfer, when the USB transfers one more byte than the number of bytes specified in the CBWDATATRANSFERLENGTH field, in the CBW. This bit sets the BLKXFRERR bit, in the USBINT0 Register (0A6h.0).

E. USBERR - USB Real Time Error Status Register

| Addr | Type | Name | Bit 7 | Bit 6 | Bit 5 | Bit 4 | Bit 3 | Bit 2 | Bit 1 | Bit 0 |
|---|---|---|---|---|---|---|---|---|---|---|
| 0A5h | R | USBERR | CNTLSTLD | BLKINSTLD | BLKOUTSTLD | BLKDIRERR | CBWLERR | FIFOERR | XFRLERR | CBWSIGERR |
|  | W | USBERR | 0 | 0 | 0 | BLKDIRERR | CBWLERR | FIFOERR | XFRLERR | CBWSIGERR |

This register provides real time error status for certain events associaated with USB transactions.

Bit 7 (R)—CNTLSTLD—Control Stalled

The USB Block detected a condition that caused it to stall the USB Control endpoint. This bit sets the STALLED bit, in the USBINT0 Register (0A0h.7).

Bit 0 (R/W)—CBWSIGERR—CBW Signature Error

When "Wait for CBW" is set in the CMDCODE field of the USBCNTL1 Register (0A6h.4 to 0A6h.1), this bit is set if the USB Block detects that the CBWSIGNATURE field in the CBW (received from the USB) is not equal to "43 42 53 55"h. This bit sets the BLKXFRERR bit in the USBINT0 Register (0A0h.6).

F. USBCNTL1 - USB Control 1 Register

| Addr | Type | Name | Bit 7 | Bit 6 | Bit 5 | Bit 4 | Bit 3 | Bit 2 | Bit 1 | Bit 0 |
|---|---|---|---|---|---|---|---|---|---|---|
| 0A6h | R/W | USBCNTL1 | RDDESPRM | CSWDTRES | NODATA | START | CMDCODE | | | |

The write port for this bit exists in the USBCBL Register (0A8h.7).

Bit 6 (R)—BLKINSTLD—Bulk-In Stalled

The USB Block detected a condition that caused it to stall the USB Bulk-In endpoint. This bit sets the STALLED bit, in the USBINT0 Register (0A0h.7).

The write port for this bit exists in the USBCBL Register (0A8h.6).

Bit 5 (R)—BLKOUTSTLD—Bulk-Out Stalled

The USB Block detected a condition that caused it to stall the USB Bulk-Out endpoint. This bit sets the STALLED bit, in the USBINT0 Register (0A0h.7).

The write port for this bit exists in the USBCBL Register (0A8h.5).

Bits 7,6, & 5 (W)—Reserved

Bit 4 (R/W)—BLKDIRERR—Bulk Direction Error

This bit is set during a Bulk-In or Bulk-Out data transfer, when the USB sends a token indicating the opposite direction of bulk transfer. This bit sets the BLKXFRERR bit, in the USBINT0 Register (0A0h.6).

Bit 3 (R/W)—CBWLERR—CBW Length Error

When "Wait for CBW" is set in the CMDCODE field of the USBCNTL1 Register (0A6h.4 to 0A6h.0), this bit is set This register provides the firmware interface for setting Mass Storage Class tasks along with certain USB and other controls to the USB block.

This register is initialized by hardware reset or setting USB Reset in the CMDCODE field of the USBCNTL1 Register (0A6h.4 to 0A6h.0).

Bit 7 (R/W)—RDDESPRM—Read Descriptor Parameters

When set to 1, the USBWL1-3 Registers are used to read parameters for the GET DESCRIPTOR request from the USB host. These Registers should be read when servicing an interrupt for the USBGETDEV, USBGETCFG, and USB-GETSTR bits in the USBINT1 Register (0A1h.3,2,1).

The LSByte of WLENGTH is read in USBCBWL1.
The LSByte of LANGID is read in USBCBWL2.
The MSByte of LANGID is read in USBCBWL3.

Bit 6 (R/W)—CSWDTRES—CSW Data Residue

When set to 1, the USB Block returns the value received as the CBWDATATRANSFERLENGTH field in the last CBW as the CSWDATARESIDUE field of all CSWs. This bit should always be set to 1 when the USB Block is set to actively wait for a CBW ("Wait for CBW" is set in the CMDCODE field, and START is set in the USBCNTL1 Register [0A6h.4-0]). If there is an error associated with the CBW received, the CSWDATARESIDUE field will contain the CBWDATATRANSFERLENGTH field, per the USB Mass Storage Class Bulk-Only Transport specification. When set to 0, the USB Block residual value (number of bytes remaining to be transferred) of its internal DTX-FRCNT Register as the CSWDATARESIDUE field of all CSWs.

Bit 5 (R/W)—NODATA—No Data

When set to 1, the Application Block responds to all USB requests received from the UDC for Bulk-In and Control-In endpoints, with a zero length data packet, that will work for the Bulk-In or Control-In types of transfer.
1: Sends a zero length data packet
0: Sends a normal data packet Bit 4 (R/W)—START—Start USB Transfer Setting this bit initiates the USB transfer or task specified by the CMDCODE bits. This bit is reset once the current task set has completed (with or without error).
1: Enable
0: Disable Bits 3, 2, 1 & 0 (R/W)—CMDCODE—CMD Code Setting the START bit, enables the following bits to provide the task or transfer type.

| CMDCODE | Task |
|---------|------|
| 0000 | Wait for CBW |
| 0001 | Bulk-In |
| 0010 | Bulk-Out |
| 0011 | CSW (good) |
| 0100 | CSW (fail) |
| 0101 | CSW (phase error) |
| 0110 | Control-In |
| 0111 | *Resume |
| 1001 | Bulk-In (zero packet) Ends the transfer with an additional zero length packet, if the transfer ends on a packet boundary. |
| 1110 | UDC Reset Resets the UDC logic. Use as a last resort. Do not use for MSBORST |
| 1111 | USB Reset Resets application logic. Use in response to MSBORST (0A0h.3) |

*Setting CMDCODE asserts DEVRESUME to the UDC when UDCSUSPEND is asserted. The Application Block asserts DEVRESUME for one UDCCLK period and resets the START bit.

USB transaction. The STALLED bit, in the USBINT0 Register (0A0h.7,R), and the appropriate BLKINSTLD or BLKOUTSTLD bit, in the USBERR Register (0A5h.6,5), are set at the end of the transaction in which this error was detected.

Bit 4 (R/W)—STLFIFOERR—Stall FIFO Error

When set to 1, the USB Block is allowed to set a stall condition to the USB as a result of the FIFOERR bit being set in the USBERR Register (0A5.2). The DEVSTALLD signal is set on the UDC/Application interface for the next USB transaction. The STALLED bit, in the USBINT0 Register (0A0h.7,R), and the appropriate BLKINSTLD or BLKOUTSTLD bit, in the USBERR Register (0A5h.6,5), are set at the end of the transaction in which this error was detected.

Bit 3 (R/W)—STLXFRLERR—Stall Transfer Error

When set to 1, the USB Block is allowed to set a stall condition to the USB as a result of the XFRLERR bit set in the USBERR Register (0A5h.1). The DEVSTALLED signal is set on the UDC/Application interface for the next USB transaction. The STALLED bit, in the USBINT0 Register (0A0h.7,R), and the appropriate BLKINSTLD or BLKOUT-STLD bit, in the USBERR Register (0A5h.6,5), are set at the end of the transaction in which this error was detected.

Bit 2 (R/W)—CONTXFR

When set to 1, if the USB logic encounters a FIFO underrun condition, it will send NACK handshakes on the USB wire until the condition that caused the FIFO overrunis rectified. This bit is used for allowing multiple block decoder transfers to satisfy a single CBW transfer request. USB NACKS, between the multiple block decoder transfers, are used for flow control on the USB Bus. After the last block decoder transfer is triggered—intended to end the CBW transfer—this bit should be set to 0.

G. USBCNTL2 - USB Control 2 Register

| Addr | Type | Name | Bit 7 | Bit 6 | Bit 5 | Bit 4 | Bit 3 | Bit 2 | Bit 1 | Bit 0 |
|------|------|------|-------|-------|-------|-------|-------|-------|-------|-------|
| 0A7h | R/W | USBCNTL2 | 0 | STLPKT | STLDIRERR | STLFIFOERR | STLXFRLERR | CONTXFR | INT0/1 | USBENBL |

This register provides the firmware interface for setting global function controls and parameters in the USB Block.

This register is initialized by hardware reset or setting USB Reset in the CMDCODE field of the USBCNTL1 Register (0A6h.4 to 0A6h.0).

Bit 7 (R/W)—Reserved

Bit 6 (R/W)—STLPKT—Stall Current Packet

When set to 1, the logic will attempt to send a stall PID as soon as possible when the USB is set to cause a stall (USBCNTL2 Register bit 5, 4, or 3 [0A7h.5,4,3]=1) and the logic detects a condition that would cause a stall.

Bit 5 (R/W)—STLDIRERR—Stall Direction Error

When set to 1, the USB Block is allowed to set a stall condition to the USB as a result of the BLKDIRERR bit set in the USBERR Register (0A5h.4). The DEVSTALLED signal is set on the UDC/Application interface for the next Bit 1 (R/W)—INT0/1—Interrupt 0/1

When set to 1, this bit enables the USB Block interrupt, resulting from bits set in the USBINT Registers, to be driven on USBINT1. When set to 0, this bit enables the USB Block interrupt, resulting from bits set in the USBINT Registers, to be driven on USBINT0.

Bit 0 (R/W)—USBENBL—USB Enable

When set to 1, the USB mode is enabled for the USB data transfer through the USB Block. When set to 0, the ATAPI mode is enabled and USBCLK4X is disabled in the Application Block. The default state of this bit is 0 following hardware reset. This bit determines which signals are driven off the chip on the common USB/ATAPI pins. It also selects the ATAPI input pins or the USB Block Application Data Transfer outputs to be driven to the block decoder.

| H. USBCBL - USB Command Block Length Register |||||||||||
|---|---|---|---|---|---|---|---|---|---|---|
| Addr | Type | Name | Bit 7 | Bit 6 | Bit 5 | Bit 4 | Bit 3 | Bit 2 | Bit 1 | Bit 0 |
| 0A8h | R | USBCBL | 0 | 0 | 0 | USBCBLENGTH(4–0) | | | | |
|  | W | USBCBL | CNTLSTL | BLKINSTL | BLKOUTSTL | 0 | 0 | 0 | 0 | 0 |

When "Wait for CBW" is set in the CMDCODE field of the USBCNTL1 Register (0A6h.4 to 0A6h.0), the USB Block loads bits A-0 of this register with the CBWCBLENGTH field of the CBW, as it is received from the USB.

This register is initialized by hardware reset or setting USB Reset in the CMDCODE field of the USBCNTL1 Register.

Bits 7, 6, & 5 (R)—Reserved
Bit 7 (W)—CNTLSTL—Control Stalled
The USB Block detected a condition that caused it to stall the USB Control endpoint. This bit sets the STALLED bit, in the USBINT0 Register (0A0h.7).
The read port for this bit exists in the USBERR Register (0A5h.7).
Bit 6 (W)—BLKINSTL—Bulk-In Stalled
The USB Block detected a condition that caused it to stall the USB Bulk-In endpoint. This bit sets the STALLED bit, in the USBINT0 Register (0A0h.7).
The read port for this bit exists in the USBERR Register (0A5h.6).
Bit 5 (W)—BLKOUTSTL—Bulk-Out Stalled
The USB Block detected a condition that caused it to stall the USB Bulk-Out endpoint. This bit sets the STALLED bit, in the USBINT0 Register (0A0h.7).
The read port for this bit exists in the USBERR Register (0A5h.5).
Bits 4, 3, 2, 1, & 0 (R/W)—USBCBLENGTH—USB Command Block Length
These bits hold the BCB length field from the last CBW received.

| I. USBCLK - USB Clock Select Register |||||||||||
|---|---|---|---|---|---|---|---|---|---|---|
| Addr | Type | Name | Bit 7 | Bit 6 | Bit 5 | Bit 4 | Bit 3 | Bit 2 | Bit 1 | Bit 0 |
| 0A9h | R/W | USBCLX | 0 | 0 | 0 | 0 | 0 | USBCKSEL | UDECCK1 | UDECCK0 |

Bits 7, 6, 5, 4, & 3 (R/W)—Reserved
Bit 2 (R/W)—USBCKSEL—USB Clock Select
1: Uses external 48 MHz—Pin HA0
0: Uses internal 48 MHz—PLLC0/PLLC1 must be programmed to 96 MHz
Bits 1 & 0 (R/W)—UDECCK1-0)—USB Decoder Clock Select 1 & 0
In the USB mode, the PLL is programmed to 96 MHz, which is also the clock for the block decoder. These two bits allow division of the 96 MHz clock by 1, 2, 3, or 4 before being used by the block decoder.
00: PLLC0/PLLC1 (1FDh, 1FEh)—96 MHz
01: PLLC0/PLLC1 (1FDh, 1FEh)/2—48 MHz
10: PLLC0/PLLC1 (1FDh, 1FEh)/3—32 MHz
11: PLLC0/PLLC1 (1FDh, 1FEh)/4—24 MHz
In USB, PLLC0 and PLLC1 must be programmed to provide 96 MHz.

| J. USBCBWL0 - USB CBW Data Transfer Length 0 Register |||||||||||
|---|---|---|---|---|---|---|---|---|---|---|
| Addr | Type | Name | Bit 7 | Bit 6 | Bit 5 | Bit 4 | Bit 3 | Bit 2 | Bit 1 | Bit 0 |
| 0AAh | R | USBCBWL0 | USBCBWDATATRANSFERLENGTH(7–0) | | | | | | | |

When "Wait for CBW" is set in the CMDCODE field of the USBCNTL1 Register (0A6h.4 to 0A6h.0), the USB Block loads this register with bits 7–0 of the CDB-DATATRANSFERLENGTH field of the CBW, as it is received from the USB.

This register is initialized by hardware reset or setting USB Reset in the CMDCODE field of the USBCNTL1 Register.

K. USBCBWL1 - USB CBW Data Transfer Length 1 Register

| Addr | Type | Name | Bit 7 | Bit 6 | Bit 5 | Bit 4 | Bit 3 | Bit 2 | Bit 1 | Bit 0 |
|---|---|---|---|---|---|---|---|---|---|---|
| 0ABh | R | USBCBWL1 | USBCBWDATATRANSFERLENGTH(15–8) | | | | | | | |

When "Wait for CBW" is set in the CMDCODE field of the USBCNTL1 Register (0A6h.4 to 0A6h.0), the USB Block loads this register with bits 15–8 of the CBW-DATATRANSFERLENGTH field of the CBW, as it is received from the USB. If the RDDESPRM bit in the USBCNTL1 Register (0A6h.7)=1, read WLength for GET DESCRIPTOR. This register is initialized by hardware reset or setting USB Reset in the CMDCODE field of the USBCNTL1 Register. If USBCNTL1 bit 7=1, this read address will return the LSByte of WLENGTH.

L. USBCBWL2 - USB CBW Data Transfer Length 2 Register

| Addr | Type | Name | Bit 7 | Bit 6 | Bit 5 | Bit 4 | Bit 3 | Bit 2 | Bit 1 | Bit 0 |
|---|---|---|---|---|---|---|---|---|---|---|
| 0ACh | R | USBCBWL2 | USBCBWDATATRANSFERLENGTH(23–16) | | | | | | | |

When "Wait for CBW" is set in the CMDCODE field of the USBCNTL1 Register (0A6h.4 to 0A6h.0), the USB Block loads this register with bits 23–16 of the CBW-DATATRANSFERLENGTH field of the CBW, as it is received from the USB. If the RDDESPRM bit in the USBCNTL1 Register (0A6h.7)=1, read LSByte of LANGID for GET DESCRIPTOR. This register is initialized by hardware reset or setting USB Reset in the CMDCODE field of the USBCNTL1 Register. If USBCNTL1 bit 7=1, this read address will return the LSByte of LANGID.

M. USBCBWL3 - USB CBW Data Transfer Length 3 Register

| Addr | Type | Name | Bit 7 | Bit 6 | Bit 5 | Bit 4 | Bit 3 | Bit 2 | Bit 1 | Bit 0 |
|---|---|---|---|---|---|---|---|---|---|---|
| 0ADh | R | USBCBWL3 | USBCBWDATATRANSFERLENGTH(31–24) | | | | | | | |

When "Wait for CBW" is set in the CMDCODE field of the USBCNTL1 Register (0A6h.4 to 0A6h.0), the USB Block loads this register with bits 31–24 of the CBW-DATATRANSFERLENGTH field of the CBW, as it is received from the USB. If the RDDESPRM bit in the USBCNTL1 Register (0A6h.7)=1, read MSByte of LANGID for GET DESCRIPTOR. This register is initialized by hardware reset or setting USB Reset in the CMDCODE field of the USBCNTL1 Register. If USBCNTL1 bit 7=1 this read address will return the MSByte of LANGID.

N. DESCRIPTORS

A description is now provided of the sizes and relative locations of the Descriptor Table elements required for implementing a USB Serial Bus node compliant with the USB Mass Storage Class Bulk-Only Transport specification, which was incorporated by reference herein. The Manufacturer and Product strings are not required by the USB Mass Storage Class Bulk-Only Transport specification but are supported by the embodiments of the USB logic.

System DRAM is used to provide actual storage of the descriptors that are accessed through hardware. The actual DRAM addresses of the Descriptor Table elements are firmware dependent. However, the Configuration, Interface, Bulk-In, and Bulk-Out descriptors should, in this embodiment, be located contiguous in memory and in the order shown below, in the Descriptor Table Memory Map.

O. DESCRIPTOR TABLE FORMAT

The values given for the blength field are shown below as an offset address from a given base address (Base Address= XX00h).

| | | | | Descriptor Table Memory Address | | | | |
|---|---|---|---|---|---|---|---|---|
| Device | Config | Interface | Bulk-In | Bulk-Out | *String Index | Manufacturer Index | Product Index | Serial Number |
| Descript or bLength (Byte) | | | | | | | | |
| 18 | 9 | 9 | 7 | 7 | 1 n 250 | 1 m 250 | 1 p 250 | 26 q 250 |

XX00h (Base Address)
*String Index 0 (LANGID code) - supports single language, only, in this embodiment.

By way of example, if the Base Address=0100h, when the Descriptor location=Base Address+Offset Address, then
Device=0100h to 0111h
  Configuration=012h to 011Bh
  String Index 0=0133h to 0224h, n=250 bytes
Of course, the implementation details of the present invention can be modified as the Mass Storage Class Bulk-Only Transfer specification is modified.

P. USB DATA TRANSFER

The USB Block transfers control information and data to and from the DRAM under control of the Buffer Manager. When control frames are received, the USB Block generates an interrupt to the microprocessor, with the type of frame set in the USBINT1 Register (0A1h). The microprocessor then writes data for the response frame to the DRAM. Data transfers use the DRAM pages utilized by the encoder and decoder blocks.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a Verilog hardware description language available from Cadence Design of San Jose, Calif., may be used to design an appropriate silicon-level layout.

The invention may employ various computer-implemented operations involving data stored in computer systems to drive computer peripheral devices (i.e., in the form of software drivers). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A controller for use in a mass storage peripheral device comprising:
   a block decoder/encoder for processing data to and from a media of the mass storage peripheral device:
   an interface configured to process data and control signals for selectively communicating data to and from the mass storage peripheral device during operation in a first mode, the interface being shared to process data and control signals in other than the first mode; and
   logic configured to process data and control signals for selectively communicating data to and from the mass storage peripheral device during operation in a second mode, the logic for operation in the second mode borrowing data transfer control logic of the interface when exclusively operating in the second mode
   wherein the logic is universal serial bus (USB) logic and the interface is an ATAPI interface and the USB logic further includes,
      a USB pad cell that provides connection to and from a USB cable and the ATAPI interface; and
      USB core logic in communication with the USB pad cell, the ATAPI interface, and a microprocessor interface, the USB core logic including,
         a smart FIFO for coordinating USB data transfers to and from the mass storage peripheral device;
         an I/O select that is placed into either the ATAPI mode or the USB mode;
         an application unit having a plurality of registers at least one register being an enable register for setting the I/O select; and
         a USB device controller for performing packetizing and de-packetizing of data being transferred in the USB mode.

2. A controller for use in a mass storage peripheral device as recited in claim 1, wherein the smart FIFO includes, storage;

a retry control; and a sequencer.

3. A controller for use in a mass storage peripheral device as recited in claim 2, wherein the storage is a 64×8 bit memory device.

4. A controller for use in a mass storage peripheral device as recited in claim 2, wherein the retry control includes pointer logic and counters for accessing the storage.

5. A controller for use in a mass storage peripheral device as recited in claim 1, further comprising:

a USB data bus is linked with the smart FIFO, and the smart FIFO is linked with the ATAPI interface.

6. A controller for use in a mass storage peripheral device as recited in claim 5, wherein the USB data bus is an 8 bit bus, which is a subset of an ATAPI data bus that is connected to the ATAPI interface.

7. A controller for use in a mass storage peripheral device comprising:

a block decoder/encoder for processing data to and from a media of the mass storage peripheral device;

an interface configured to process data and control signals for selectively communicating data to and from the mass storage peripheral device during operation in a first mode, the interface being shared to process data and control signals in other than the first mode, and logic configured to process data and control signals for selectively communicating data to and from the mass storage peripheral device during operation in a second mode, the logic for operation in the second mode borrowing data transfer control logic of the interface when exclusively operating in the second mode:

wherein the logic is universal serial bus. (USB) logic and the interface is an ATAPI interface and the data transfer control logic utilized by the USB logic and implemented by the ATAPI interface includes signals HA2, HA1, HA0, DMACK#, HRD#, HWR#, HRST#, ARST#, CS3FX#, and CS1FX#.

8. A controller for use in a mass storage peripheral device as recited in claim 7, wherein HA0 becomes a 48 MHz clock signal when in the USB mode.

9. A method for making a controller for use in a peripheral device, the controller being capable for operating the peripheral device in one of a first mode and a second mode, comprising;

integrating a first interface to the controller, the first interface being configured to control data transfers to and from the peripheral device in the first mode and enable processing of data transfers to and from the peripheral device in other than the first mode; and integrating a logic block to the controller, the logic block being configured to facilitate data transfers to and from the peripheral device in the second mode, the logic block being configured to use data transfer control from the first interface to complete the data transfers in the second mode when exclusively operating in the second mode, wherein the first mode is an ATAPI mode and the second mode is a USB mode, and the first interface is an ATAPI interface and the logic block is a USB logic block, and the integrating of the USB logic block further includes.

integrating a USB pad cell to the USB logic block, the USB pad cell providing connection to a USB cable and to the ATAIP interface, and integrating a USB core logic to the USB logic block, the USB core logic is configured to control data transfers in the USB mode, and the USB core logic is configured to interface with a microprocessor interface, the integrating of the USB core logic further includes.

integrating a smart FIFO to the USB core logic;

integrating an I/O select to the USB core logic;

integrating an application block to the USB core logic: and integrating a USB device controller to the USB core logic.

10. A method for making a controller for use in a peripheral device as recited in claim 9, wherein the integrating of the smart FIFO further comprises:

integrating a storage device to the smart FIFO;

integrating a retry control to the smart FIFO; and integrating a sequencer to the smart FIFO.

11. A method for making a controller for use in a peripheral device as recited in claim 9, wherein the peripheral device is a CD-RW device.

12. A controller for use in a compact disc rewritable (CD-RW) peripheral device, comprising:

a block decoder/encoder for processing data to and from a media of the CD-RW peripheral device;

an ATAPI interface configured to process data and control signals for selectively communicating data to and from the CD-RW peripheral device during operation in an ATAPI mode; and universal serial bus (USB) logic configured to process data and control signals for selectively communicating data to and from the CD-RW peripheral device during operation in a USB mode, the USB logic is configured to utilize data transfer control logic that is part of the ATAPI interface, the USB logic includes, a USB pad cell that provides connection to and from a USB cable and the ATAPI interface; and USB core logic in communication with the USB pad cell, the ATAPI interface, and a microprocessor interface: the USB core logic includes, a smart FIFO for coordinating USB data transfers to and from the CD-RW peripheral device:

an I/O select that is placed into either the ATAPI mode or the USB mode:

an application unit having a plurality of registers, at least one register being an enable register for setting the I/O select, and a USB device controller for performing serializing and de-serializing of data being transferred in the USB mode.

13. A controller for use in a compact disc rewritable (CD-RW) peripheral device as recited in claim 12, wherein the smart FIFO includes, storage;

a retry control; and a sequencer.

14. A controller for use in a compact disc rewritable (CD-RW) peripheral device as recited in claim 13, wherein the storage is a 64×8 bit memory device.

15. A controller for use in a compact disc rewritable (CD-RW) peripheral device as recited in claim 14, wherein the retry control includes pointer logic and counters for accessing the storage.

16. A controller for use in an optical storage device, comprising:

a block decoder/encoder for processing data to and from a media of the optical storage device;

an ATAPI interface configured to process data and control signals for selectively communicating data to and from the optical storage device during operation in an ATAPI mode, the ATAPI interface being shared to process data and control signals in other than the ATAPI mode; and universal serial bus (USB) logic configured to process data and control signals for selectively communicating data to and from the optical storage device during operation in a USB mode, the USB logic for operation in the USB mode borrowing data transfer control logic of the ATAPI interface when exclusively operating in the USB mode, wherein the USB logic includes, a USB pad cell that provides connection to and from a USB cable and the ATAPI interface; and USB core logic in communication with the USB pad cell, the ATAPI interface, and a microprocessor interface, and the USB core logic includes, a smart FIFO for coordinating USB data transfers to and from the optical storage device;

an I/O select that is placed into either the ATAPI mode or the USB mode;

an application unit having a plurality of registers, at least one register being an enable register for setting the I/O select: and a USB device controller for performing serializing and de-serializing of data being transferred in the USB mode.

17. A controller for use in an optical storage device as recited in claim 16, wherein the smart FIFO includes, storage;

a retry control; and a sequencer.

18. A controller for use in an optical storage device as recited in claim 17, wherein the storage is a 64×8 bit memory device.

19. A controller for use in an optical storage device as recited in claim 17, wherein the retry control includes pointer logic and counters for accessing the storage.

20. A controller for use in an optical storage device as recited in claim 16, wherein the optical storage device is one of a CD-ROM, a CD-R, a CD-RW, a DVD.

21. A controller for use in an optical storage device as recited in claim 16, wherein the optical storage device is one of an internal peripheral device and an external peripheral device.

* * * * *